(12) United States Patent  
Ganesan et al.

(10) Patent No.: US 12,506,906 B2  
(45) Date of Patent: Dec. 23, 2025

(54) BUFFER MANAGEMENT FOR PRE-CACHED AUDIO/VISUAL DATA

(71) Applicant: DISH Network Technologies India Private Limited, Karnataka (IN)

(72) Inventors: Vimalraj Ganesan, Bangalore (IN); Amit Kumar, Bangalore (IN); Rakesh Eluvan, Bangalore (IN)

(73) Assignee: DISH Network Technologies India Private Limited (IN)

( * ) Notice: Subject to any disclaimer, the term of this patent is extended or adjusted under 35 U.S.C. 154(b) by 0 days.

(21) Appl. No.: 18/617,123

(22) Filed: Mar. 26, 2024

(65) Prior Publication Data

US 2024/0333983 A1    Oct. 3, 2024

(51) Int. Cl.
*H04N 21/231* (2011.01)
*H04N 21/2343* (2011.01)
*H04N 21/239* (2011.01)

(52) U.S. Cl.
CPC .......... *H04N 21/23106* (2013.01); *H04N 21/234309* (2013.01); *H04N 21/2393* (2013.01)

(58) Field of Classification Search
CPC ..... H04N 21/23106; H04N 21/234309; H04N 21/2393
See application file for complete search history.

(56) References Cited

U.S. PATENT DOCUMENTS

| | | | |
|---|---|---|---|
| 9,143,825 B2 | 9/2015 | Chittella | |
| 9,462,032 B2* | 10/2016 | Lieber | H04L 65/762 |
| 9,680,896 B2* | 6/2017 | Sheynman | H04W 4/18 |
| 9,877,070 B2 | 1/2018 | Krikorian et al. | |
| 10,244,016 B1* | 3/2019 | Binns | H04L 65/765 |
| 11,611,542 B2 | 3/2023 | Ranganathan et al. | |
| 11,627,345 B1 | 4/2023 | Kumar et al. | |
| 11,698,987 B2 | 7/2023 | Ramaraj et al. | |
| 2021/0385540 A1* | 12/2021 | Mayhew | H04N 21/440218 |

* cited by examiner

*Primary Examiner* — Mulugeta Mengesha
(74) *Attorney, Agent, or Firm* — KW Law, LLP

(57) ABSTRACT

Systems, devices and automated processes are described for improving media streaming in a server device through intelligent selection of initial cache bitrates. The initial cache bitrate is selected with consideration to both historical data and operating parameters of the server device. Operating parameters can include an amount of cache memory that is available on the server device, as well as an amount of reserve space that is desired to be maintained in case of degradation in network performance or other factors that may occur during transcoding or transmission of the media stream.

20 Claims, 2 Drawing Sheets

BUFFER MANAGEMENT FOR PRE-CACHED AUDIO/VISUAL DATA

PRIORITY CLAIM

This application claims priority to India Provisional Application Serial No. 202341024926 filed on Mar. 31, 2023, which is incorporated herein by reference. WIPO has issued DAS Code B48D for that application.

TECHNICAL FIELD

The following generally relates to streaming audio/video media content. More particularly, the following relates to systems, devices and automated processes to select an appropriate bitrate for cached content that is received prior to media streaming, thereby making more efficient use of digital processing and storage capabilities.

BACKGROUND

Media streaming has become increasingly popular since its introduction in the early years of the twenty-first century. Streaming media has changed the way people watch movies and television, allowing people to enjoy their favorite shows and movies on their own schedule, and in any desired location. In particular, media streaming allows viewers to watch television or other content from their phones, tablets, computers and/or other media players rather than being bound to conventional television screens.

Many viewers now receive media content delivered over the Internet via services such as SLING TV, NETFLIX, HULU and/or the like. Additionally, some viewers make use of consumer-type "placeshifting devices" that are located in the home or other customer premises. These devices receive television broadcasts for transcoding and transmission over a network as a personal media stream. One example of a widely-deployed placeshifting device is the AIRTV product available from SLING TV, which receives terrestrial HDTV broadcasts via an antenna and transcodes the received content for secure streaming to viewers' phones, tablets, computers, media players, smart TVs and/or other devices.

Placeshifting devices such as the AirTV product are typically designed as consumer products, so price to the customer is a substantial design consideration. The desire to minimize the cost of hardware while maintaining adequate performance can present substantial design challenges. Generally, it is desirable to provide a high quality media stream with relatively low latency while using hardware that is relatively inexpensive. It is also desirable to efficiently manage the use of solid state or other digital cache within the device to prevent unnecessary consumption of energy and to avoid overruns of limited storage space.

A substantial desire therefore exists to build systems, devices and automated processes that allow for efficient selection of data cache rates for video streaming. These and other features are described in increasing detail below.

BRIEF DESCRIPTION

Systems, devices and automated processes are described to select a cache bitrate for storing digital audio/visual content prior to transcoding for streaming. Generally speaking, it is desirable to cache the content received from an antenna or other source at a bitrate that matches the streaming bitrate between the client and server devices. This ensures adequate data to preserve video quality without over-utilizing available storage and processing.

Before streaming begins, however, it can be difficult to accurately predict the transfer bitrate that will occur. Various embodiments therefore determine a "maximum" acceptable cache bitrate based upon device's capabilities and a desired amount of reserve or "cushion" space to be left in the cache. The reserve space is appropriately designed to hold sufficient data (albeit at a lower bitrate) to maintain the data stream even if the cached content is initially set to an unsustainably high quality. To determine the initial cache bitrate, then, a previously-sustained bitrate used to stream AV content to the client device is compared to the determined maximum acceptable cache bitrate. If the maximum rate is greater than the previously-sustained rate, the maximum rate is used for initial caching. Otherwise, the previously-sustained rate can be used for caching received content. Some implementations may further provide for transcoding of previously-cached data if the initial bitrate is set too high, thereby making use of previously-received data while simultaneously freeing up additional space in the cache buffer.

More particularly, various embodiments provide an automated process performed by a computer device comprising a processor, a digital storage and an interface to a network. The automated process suitably comprises: receiving, by the computer device via the interface, a request to stream media content to a client device via the network; in response to the request, obtaining the media content by the computer device; determining, by the computer device, a cache bitrate to cache the obtained media content based at least in part upon a desired cache reserve size; caching the obtained media content in the digital storage at the determined bitrate; transcoding the obtained media content stored in the digital storage to a format suitable for transmission via the network; and streaming the transcoded media content to the client device via the network.

Other embodiments provide a computer device comprising a processor, a non-transitory digital storage and an interface to a digital network. The non-transitory digital storage comprises computer-executable instructions that, when executed by the processor, perform an automated process to obtain content requested by a client device, to determine a cache bitrate for caching the obtained content based at least in part upon a desired cache reserve size, to transcode the received content for transmission on the network, and to stream the transcoded content to the client device. The computer device may further comprise digital media storage, as in a digital video recorder, or another interface to receive media content via a terrestrial or satellite broadcast, or via the network as desired. The initial bitrate for caching content may be determined, for example, based upon a comparison of a previous streaming bitrate with the client device to a maximum bitrate determined based upon available cache space for the computer device, a desired cache reserve size and a desired content time to cache for the computer device.

Further embodiments could additionally or alternately transcode cached content to a lower bitrate if it is determined that the current cache bitrate is unsustainable, thereby allowing for use of previously-cached content while freeing up space in the over-utilized cache.

Additional embodiments provide other systems, devices, computing systems and automated processes substantially as described herein, and/or their legal equivalents.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, received media data is pre-cached at a data rate that is selected to match the throughput available between the server and any client devices that are processing the media stream. Throughput matching can be a challenge, however, at the outset of streaming before real-time bandwidth tests are available. Additionally, it can be desirable to recover quickly from any inaccurate bitrate estimates by changing the bitrate and avoiding loss of cached content. Various embodiments therefore intelligently select the cache bitrate based on a comparison of a previously-experienced streaming bitrate to a "maximum" bitrate that preserves a portion of the cache for fallback, if necessary. Various implementations may further provide for graceful fallback without discarding pre-cached data if the initial bitrate turns out to be too high in practice, thereby leading to overfill of the cache.

Figure 1:
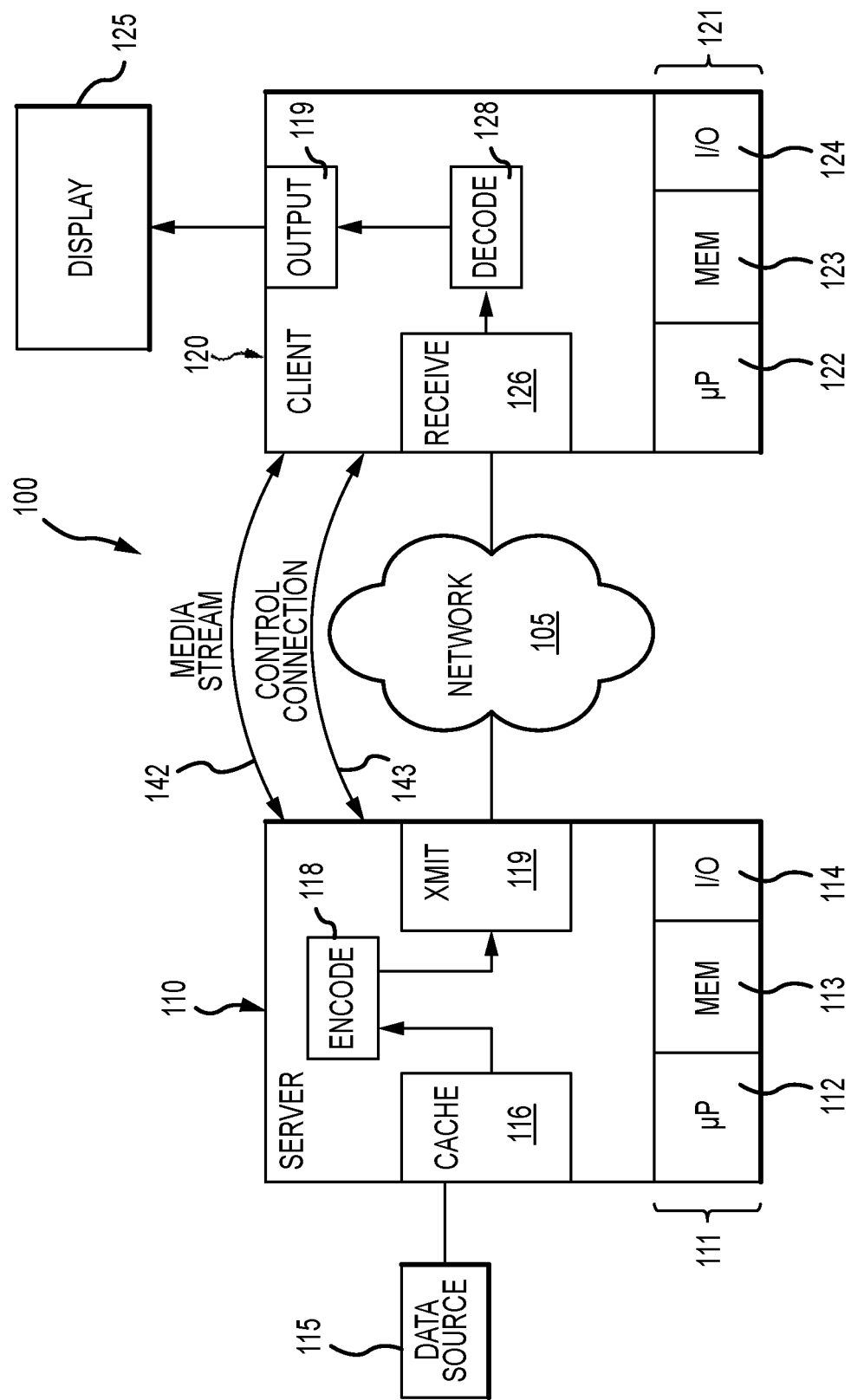
FIG. 1 illustrates an example architecture of a video streaming system in which a server device obtains, caches and transmits media content to a client device.

With reference now to FIG. 1, an example media streaming system 100 suitably includes a server device 110 that delivers a media stream 142 to a client device 120 via a network 105. Client device 120 appropriately instructs the server device 110 via a control connection 143 or the like to obtain audio/video or other media content from a data source 115. The server device 110 obtains the requested content from the data source 115 and temporarily stores the received data in cache 126 for subsequent processing. In many implementations, the cached data is transcoded into a format compatible with streaming on network 105 for transmission to client device 120, as desired.

As noted above, it can be a substantial technical challenge for the server device 110 to select the proper parameters for receiving and processing digital media content. In particular, it is desirable to set an initial cache bitrate at an appropriate level so that enough digital data is obtained for a good quality stream without overwhelming the limited space in cache 126. Setting the cache bitrate too high could result in unnecessary data processing, or even the potential of cache overflow in extreme cases. If the cache 126 overflows due to the cache 126 filling faster than it can be emptied, data can be lost and the user experience will be degraded. Conversely, setting the cache bitrate too low can result in an undesirably low quality media stream, which also degrades the user experience.

Cache 126 could theoretically be filled at the same rate that it empties. This would avoid storage of unneeded data, while ensuring that enough data is available for encoding and delivery via network 105. In practice, however, it can be difficult to determine the rate at which cache 126 will be emptied due to variations in network conditions. That is, if network 105 is shared between multiple devices, users and/or processes, it can be difficult to predict the amount of bandwidth available and/or the latency of the network at any given time. After media streaming has commenced, it may be possible to measure actual fill and empty rates of cache 126, which can be used to adjust various parameters including cache bitrate.

Generally, it is desirable to provide the received media content as quickly as possible after it is requested by the viewer to avoid lag in the user experience. At the outset of media streaming, however, real time estimates of the then-current condition of network 105 may not be available. The initial cache bitrate can be initially established using historical data (e.g., a previous transmission rate with the same client device 120), if desired. But if historical data is used alone, this information can be subject to error if network conditions change, or if the client device 120 moves to a different network location (e.g., a WAN connection instead of a LAN), and/or any number of other factors. A more reliable technique for setting the initial cache bitrate therefore considers historical data (e.g., a previous streaming rate) as constrained by the processing capabilities of the cache 126 and/or server device 110, as described more fully herein.

Server device 110 is any computer device that is capable of obtaining media content from any data source 115 and delivering the received content to client device 120 via network 105. In many embodiments, server device 110 is a consumer-type device that is intended for use in a home, office or similar premises. To that end, server device 110 is any sort of media receiver, set top box, video game player, television receiver, media encoder, placeshifting device, computer system and/or the like. In one example, server device 110 is implemented using the AIRTV or AIRTV2 products available from SLING TV L.L.C. of Meridian, Colorado, although equivalent embodiments may be implemented using any other products available from any source, including any products that are subsequently developed.

In the example illustrated in FIG. 1, server device 110 suitably includes hardware 111 such as a microprocessor 112, memory 113 and input/output interfaces 114. Memory 113 may be any type of non-transitory digital storage, such as any type of solid state, magnetic, optical or other storage device. Typically, memory 113 stores computer-executable software and/or firmware instructions for execution by processor 112, as appropriate to carry out the various functions described herein.

As noted above, server device 110 suitably reacts to instructions received from client device 120 (e.g., via control connection 143 on network 105) obtain, transcode and stream media content from source 115. In many implementations, server device 110 initially caches received digital data in a cache memory 116 for subsequent encoding/transcoding by encoder 118 and transmission via interface 119. In various embodiments, cache 116 is implemented using a portion of memory 113, but other embodiments could use separate memory space, if desired. Encoder 118 could be implemented in specialized hardware, if desired, or in software or firmware executed by processor 112. Network interface 119 could be implemented using a conventional network stack that makes use of hardware interfaces 134, as appropriate. Other embodiments may use different arrangements of hardware, software and/or firmware resources as desired.

Server device 110 obtains media content from data source 115 in any manner. In various embodiments, data source 115 includes an antenna for receiving terrestrial and/or satellite television broadcasts. In other embodiments, data source 115 may be a digital video recorder (DVR) with program content stored thereon. In still other embodiments, data source 115 may include a connection to the Internet, a local area network, a mobile telephone network and/or any other digital network for receiving streaming media content from a remote source. The AirTV products mentioned above typically include a television receiver that receives terrestrial digital television broadcasts via antenna for transcoding to streaming formats, although equivalent embodiments could receive and process media content from any other broadcast, stored and/or streaming media sources as desired.

Client device 120 is any type of computerized device capable of receiving a media stream 142 from server device 110 and decoding the media stream 142 for playback to a viewer via a display 125. In some implementations, client device 120 is implemented with a mobile telephone or tablet executing a media player application, although other embodiments could implement client device 120 using a media player, video game player, smart television, set top box, computer system or the like. Display 125 may be integrated with the client device 120 (e.g., as in a mobile phone, tablet or smart television) in some embodiments, although in equivalent embodiments client device 120 interfaces with a separate television or other display 125 for presenting media content (e.g., as in a media player or computer system that delivers a media signal to a television or display via HDMI or the like).

To that end, client device 120 as illustrated in FIG. 1 suitably includes conventional computing hardware 121 such as a microprocessor 122, memory 123 and input/output interfaces 124, as desired. Various embodiments may implement the various functions described herein using any combination of hardware, software and/or firmware as desired. In the example of FIG. 1, client device 120 suitably receives encoded digital media via connection 142 at a receiver interface 126 for buffering, decoding by decoder 128, and rendering for presentation on display 125 by display interface 129. In some implementations, specialized video decoding and/or video output hardware may also be present, although equivalent embodiments could implement the various functions described herein using computer-executable instructions stored on memory 123 for execution by processor 122.

Network 105 is any digital network or networks capable of supporting digital communications between server device 110 and client device 120. In many embodiments, network 105 is implemented using a wired or wireless local area network (LAN) in a home or similar environment. Such networks may be designed to be in compliance with one or more IEEE 802.3 and/or IEEE 802.11 standards, as desired. In some implementations, network 105 includes wide area network (WAN) or other connections that permit communications beyond the home or office environment, such as to the Internet. Still other embodiments may make use of cellular telephone or other wireless WAN networks, as desired.

In practice, then, server system 110 obtains digital media data from an antenna or other source 115 and stores the received data in cache 116 for subsequent use. The initial cache bitrate can be set based upon historical data, as constrained by various parameters relating to the processing capabilities of server system 110 as described more fully below.

Figure 2:
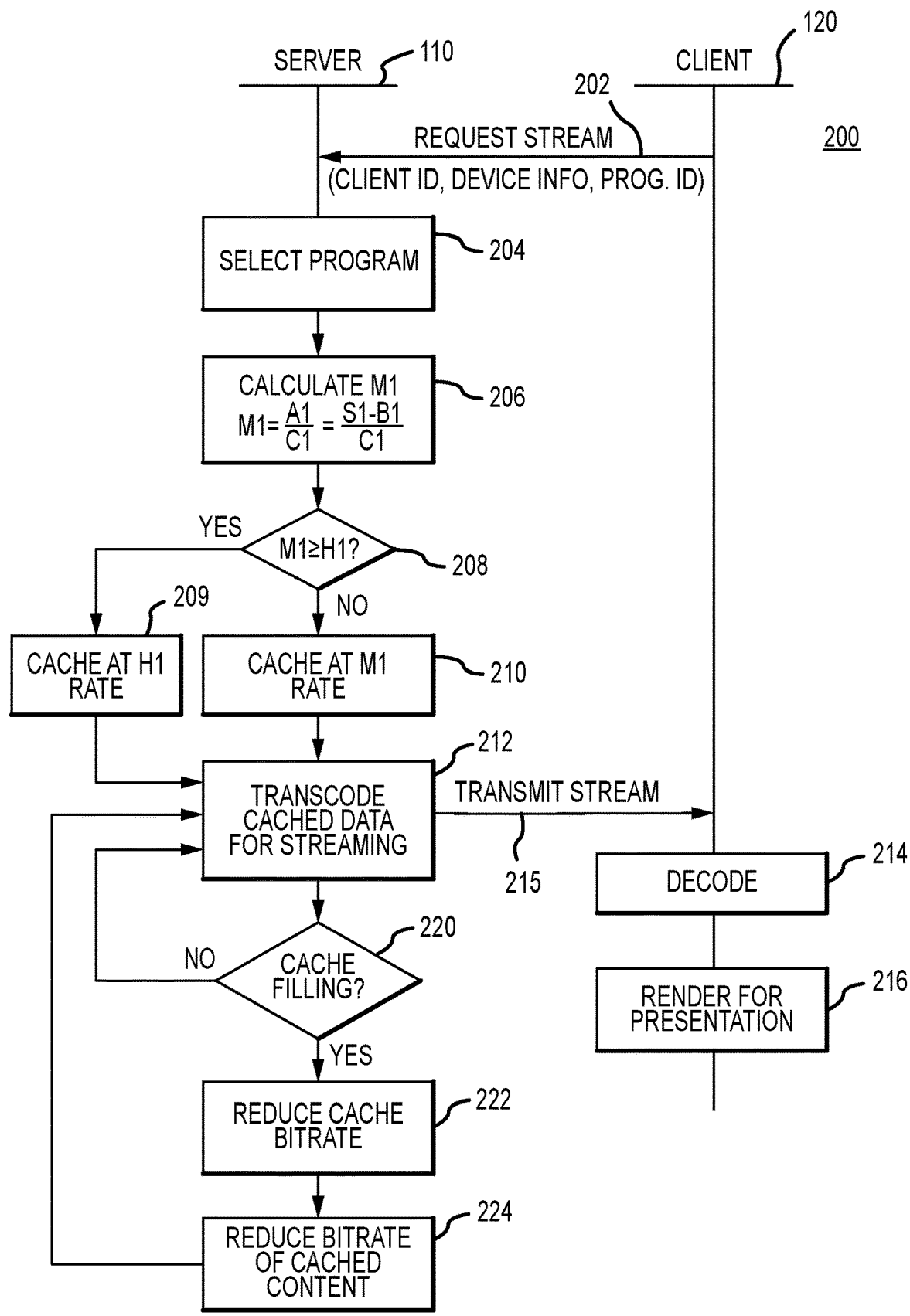
FIG. 2 illustrates an example of an automated process to determine an appropriate bitrate for caching media content for media streaming.

FIG. 2 shows an automated process 200 in which a server device 110 interacts with a client device 120 to efficiently obtain and transcode requested media content that can be forwarded to client device 120 via network 105. The various functions illustrated in FIG. 2 may be performed by processors 112 and/or 122 of server device 110 and client device 120 (respectively) executing software or firmware instructions that are stored in non-transitory digital storage 114, 124 (respectively). Other embodiments may perform the various functions using cloud-based or other hardware or software resources. Still other embodiments could modify the functions shown to incorporate additional functions, to organize the functions in any other temporal or logical order, and/or to eliminate or combine certain functions as desired.

With reference now to FIG. 2, one example of an automated process 200 suitably includes server device 110 responding to a request 202 from client device 120 by obtaining the requested program content (function 204) from content source 115, caching the received data at an appropriate cache bitrate (functions 206, 208, 209, 210), and transcoding the cached data for media streaming (functions 212, 215). During subsequent operation, the server device 110 may recognize that the cache is filling (function 220), thereby indicating that the initial cache bitrate is greater than the then-current streaming rate. In such cases, the cache bitrate can be reduced (function 222) and/or the content previously-stored in cache 116 can be transcoded (function 224) so that the stored content can be used while preserving space in the buffer.

Client device 120 requests streaming media content from server device 110 in any manner (function 202). Request 202 may include information such as a client device identifier, a customer or user identifier, information about the client device 120 (e.g., type of device, operating system version, media player version, etc.), and/or information about the requested media program. Although FIG. 2 shows a single request message 202 for simplicity, in practice several messages between the client and server devices may be needed for authentication, authorization, configuration, program identification, content selection and the like.

Server device 110 responds to the request 202 by selecting and obtaining the requested media programming in any manner (function 204). In various embodiments, server device 110 controls a television receiver, DVR controller or the like to select and obtain the desired program. In other embodiments, the server device 110 selects a default program (e.g., a last channel received, a favorite channel, a channel having the strongest broadcast signal, a popular channel, and/or the like) for streaming until the user selects a different program. This can be useful in obtaining media data as quickly as possible, thereby leading to a more responsive user experience. Again, media programming can be selected, tuned or otherwise obtained in any manner desired.

As noted above, it can be very desirable to select an initial value of the cache bitrate (M1) that approximates the most likely streaming rate while allowing for efficient recovery under adverse network conditions (function 206). To accommodate both of these constraints, various embodiments begin caching by considering both a previous streaming rate (H1) observed between the server device 110 and the client device 120 and a maximum desired rate (M1) that is determined based upon the capabilities of the server device 110 and/or client device 120.

In the example of FIG. 2, determining the maximum desired rate (M1) suitably involves determining an available cache space (A1) and a desired time (C1) of content to be stored in the cache 126. Both of these parameters can vary based upon the desired implementation and upon the particular capabilities of server device 110. The amount of cached content (C1) will vary based upon the amount of cache memory available to server device 110. In one example, C1 may be on the order of about five seconds or so, although other embodiments could vary substantially. Similarly, the amount of available cache space (A1) can be determined based upon the total amount of cache space available (S1) and an amount of reserved space (B1) to be kept unused in case of adverse conditions. If the network were to suddenly degrade, for example, the reserved space B1 could still hold enough reserve content to maintain the connection 143 in many instances. The quality of content stored in the reserve space B1 could be degraded as needed to fit as much content as possible into the available cache space, as desired. In this example, the maximum bitrate (M1) that can be held in the available cache space (A1) for the duration C1 is given by the following equation:

$$M1 = \frac{A1}{C1} = \frac{(S1 - B1)}{C1}$$

Other embodiments could adjust these parameters and/or use different constraints to select the initial cache bitrate, as desired.

The initial cache bitrate for incoming media content is therefore selected by comparing a historical bitrate (H1) previously used to stream content to client device 120 with a maximum bitrate (M1) that is based upon resources available to the server device 110 (function 208). Once the initial cache bitrate is determined, then audio/video data received from data source 115 can be received and stored in the cache 126 at the appropriate bitrate (functions 209, 210). Generally, the lesser of the maximum bitrate and the historical bitrate will be used for greatest reliability. That is, if the maximum bitrate (M1) is less than the historical bitrate (H1), then the maximum bitrate M1 will typically be used for initial caching (function 210). Conversely, if the historical bitrate is less than the maximum bitrate, then the historical bitrate will be used (function 209). Equivalent embodiments may perform the comparison in other ways to achieve the same or similar results.

Caching 209, 210 may proceed in any manner. In various embodiments, digital audio/video content is received from an antenna, tuner or other content source 115 at a relatively high bitrate that is well in excess of the bitrate needed for media streaming. An HDTV television broadcast, for example, could contain sufficient data to render 4K (or greater) television imagery. This will typically be well in excess of the quality needed or desired for media streaming. To that end, content can be decimated or otherwise processed so that only the desired bitrate is maintained in the cache, with additional data being discarded to preserve cache space and to reduce processing overhead.

Cached media data may be encoded, transcoded and/or otherwise processed in any manner (function 212), and transcoded content can be provided as media stream 143 to client device 120 in any manner (function 215). "Transcoding" of cached data will typically include format conversion from MPEG2 or other television format to a format that is more suitable for media streaming (e.g., HTTP Live Streaming format, MPEG5 format, SlingStream or other proprietary streaming formats and/or the like). Transcoding may also include compression, decimation, DRM encoding, encryption and/or any other processing as desired to place the received data into a format that can be readily transmitted and securely used by client device 120. The transcoded content is then transmitted as media stream 143 to client device 120 via network 105 as desired (function 215). Transmission may occur by encapsulating the encoded media content into transmission control protocol (TCP) and/or user datagram protocol (UDP) packets for transmission on network 105, or in any other manner desired.

Client device 120 therefore receives the media stream 143 from the server device 110 via network 105, decodes the digital content contained in the stream (function 214) as appropriate, and renders the decoded content for presentation to a viewer via display 125 (function 216). As noted above, display 125 may be integrated with device 120 (e.g., as in a mobile phone or tablet), and/or the decoded content can be rendered via a wired or other interface (e.g., an HDMI cable) as in a media player, computer system or the like.

As noted above, selecting the cache bitrate to preserve a "cushion" space (B1) in the cache 126 can be very useful if network conditions should suddenly degrade. Rather than flushing the cache 126 to free up additional space, the device 110 can continue to operate with the existing data because reserve space exists in cache 126. Various embodiments therefore recognize when the cache fills (function 220) so that the cache bitrate can be reduced (function 222) prior to cache overflow. Recognizing that the cache 126 is filling may involve tracking an actual buffer utilization parameter, if available. Additionally and/or alternatively, cache utilization can be monitored by tracking the rate by which the cache empties in comparison to the rate at which the cache fills. If the cache 126 empties at a slower rate than it is filling, then the cache will eventually overflow, thereby justifying a remedial action to prevent data loss.

In some implementations, media data previously stored in cache 126 can be retained and used even when cache utilization is undesirably high. For example, the previously-cached data can be transcoded or otherwise decimated to a lower bitrate (function 224) if the cache 126 is filling. This potentially reduces the likelihood of gaps in the media stream while freeing up additional space in the cache 126. While other embodiments will omit this feature, it can be useful in improving the user experience in some circumstances.

Using the various systems, structures and processes described above, a media server device can be made more efficient. By intelligently selecting the initial cache bitrate with consideration to both historical data and to parameters of the device itself, performance can be improved while reducing the likelihood of a cache overflow. This permits more efficient hardware utilization in terms of storage capacity and processing cycles while reducing energy consumption. The more efficient processing may also provide a benefit in terms of allowing media streaming to be performed by more cost-effective hardware.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by a computer device comprising a processor, a digital storage comprising a server cache and an interface to a network, the automated process comprising:
   receiving, by the computer device via the interface, a request to stream media content to a client device via the network;
   in response to the request, obtaining the media content by the computer device;
   determining, by the computer device, a cache bitrate to store the obtained media content in the server cache prior to transmitting the media content to the client device, the cache bitrate determined at least in part to preserve a desired cache reserve size in the server cache;
   storing the obtained media content in the server cache at the determined cache bitrate;
   transcoding the obtained media content stored in the server cache in the determined cache bitrate to a format suitable for transmission via the network; and
   streaming the transcoded media content to the client device via the network.

2. The automated process of claim 1 wherein the cached bitrate is determined based upon a comparison of a previous streaming bitrate between the computer device and the client device to a maximum bitrate determined based upon available space in the server cache for the computer device, the desired cache reserve size and a desired content time to cache for the computer device.

3. The automated process of claim 1 further comprising the computer device recognizing that the determined cache bitrate is unsustainable.

4. The automated process of claim 1 further comprising the computer device recognizing that the determined cache bitrate is unsustainable by recognizing that the server cache is filling faster than it is emptying.

5. The automated process of claim 4 further comprising the computer device adjusting the cache bitrate of newly-received media content in response to the computer device recognizing that the determined cache rate is unsustainable.

6. The automated process of claim 5 wherein the transcoding comprises converting the cached media content from the determined cache bitrate to a lower bitrate in response to the computer device recognizing that the current cache bitrate is unsustainable.

7. The automated process of claim 1 wherein the caching comprises decimating the obtained media content from a received bitrate to the determined cache bitrate prior to storing the obtained media content in the server cache.

8. The automated process of claim 1 wherein the cached bitrate is determined based upon a comparison of a previous streaming bitrate between the computer device and the client device to a maximum bitrate.

9. The automated process of claim 8 wherein the maximum bitrate is determined based upon an amount of available cache space in the server cache of the computer device, the desired cache reserve size and a desired content time to cache the obtained media content.

10. The automated process of claim 8 wherein the maximum bitrate (M1) is determined based upon an amount of available cache space (A1) in the server cache of the computer device and a desired reserve duration (C1) of the obtained media content to be cached so that:

$$M1 = \frac{A1}{C1}.$$

11. The automated process of claim 8 wherein the available cache space (A1) is determined based upon a difference between the total amount of cache space available in the server cache (S1) and an amount of reserved space (B1) in the server cache to be kept unused.

12. A computer device comprising a processor, a non-transitory digital storage and an interface to a network, wherein the non-transitory digital storage comprises computer-executable instructions stored thereon that, when executed by the processor, cause the computer device to perform an automated process that comprises:
   receiving, by the computer device via the interface, a request to stream media content to a client device via the network;
   in response to the request, obtaining the media content by the computer device;
   determining, by the computer device, a cache bitrate to cache the obtained media content in a server cache of the computer device;

caching the obtained media content in the server cache at the determined cache bitrate;

transcoding the obtained media content stored in the server cache in the determined cache bitrate to a format suitable for transmission via the network; and streaming the transcoded media content to the client device via the network.

13. The computer device of claim 12 wherein the cached bitrate is determined based upon a comparison of a previous streaming bitrate between the computer device and the client device to a maximum bitrate determined based upon available space in the server cache of the computer device.

14. The computer device of claim 13 wherein the automated process further comprises the computer device recognizing that the determined cache bitrate is unsustainable and responsively adjusting the cache bitrate of newly-received media content in response to the computer device recognizing that the determined cache rate is unsustainable.

15. The computer device of claim 13 wherein the automated process further comprises the computer device recognizing that the determined cache bitrate is unsustainable and responsively decimating the received media content stored in the server cache in response to the computer device recognizing that the determined cache rate is unsustainable.

16. The computer device of claim 12 wherein the maximum bitrate (M1) is determined based upon an amount of available cache space (A1) in the server cache of the computer device and a desired reserve duration (C1) of the obtained media content to be cached so that:

$$M1 = \frac{A1}{C1}.$$

17. The computer device of claim 16 wherein the available cache space (A1) is determined based upon a difference between the total amount of cache space available in the server cache (S1) and an amount of reserved space (B1) in the server cache to be kept unused.

18. The computer device of claim 12 wherein the media content is received at an obtained bitrate that is greater than the determined cache bitrate.

19. The computer device of claim 18 wherein the caching comprises decimating the obtained media content from the received bitrate to the determined cache bitrate prior to storing the obtained media content in the server cache.

20. The computer device of claim 19 wherein the automated process further comprises decimating the obtained media content stored in the server cache in response to the computer device recognizing that the determined cache bitrate is unsustainable.

* * * * *